(12) United States Patent
Ding et al.

(10) Patent No.: US 10,915,725 B2
(45) Date of Patent: Feb. 9, 2021

(54) METHOD TO GENERATE A SLAP/FINGERS FOREGROUND MASK

(71) Applicant: GEMALTO COGENT INC, Pasadena, CA (US)

(72) Inventors: Yi Ding, Pasadena, CA (US); Anne Jinsong Wang, Pasadena, CA (US)

(73) Assignee: THALES DIS USA Inc., Austin, TX (US)

( * ) Notice: Subject to any disclaimer, the term of this patent is extended or adjusted under 35 U.S.C. 154(b) by 31 days.

(21) Appl. No.: 16/458,804

(22) Filed: Jul. 1, 2019

(65) Prior Publication Data
US 2021/0004559 A1   Jan. 7, 2021

(51) Int. Cl.
*G06K 9/00* (2006.01)
*G06K 9/38* (2006.01)
(Continued)

(52) U.S. Cl.
CPC ..... *G06K 9/00033* (2013.01); *G06K 9/00067* (2013.01); *G06K 9/00087* (2013.01);
(Continued)

(58) Field of Classification Search
CPC ........ G06K 9/00033; G06K 9/60; G06K 9/38; G06K 9/40; G06K 9/00087; G06K 9/54;
(Continued)

(56) References Cited

U.S. PATENT DOCUMENTS

| | | | |
|---|---|---|---|
| 2014/0044323 A1* | 2/2014 | Abramovich | G06K 9/00033 382/124 |
| 2014/0068740 A1* | 3/2014 | LeCun | G06F 21/32 726/7 |

(Continued)

*Primary Examiner* — Premal R Patel
(74) *Attorney, Agent, or Firm* — The Jansson Firm; Pehr B. Jansson

(57) ABSTRACT

The present invention relates to a method to generate a slap/fingers foreground mask to be used for subsequent image processing of fingerprints on an image acquired using a contactless fingerprint reader having at least a flash light, said method comprising the following steps:

acquisition of two images of the slap/fingers in a contactless position in vicinity of the reader, one image taken with flash light on and one image taken without flash light, calculation of a difference map between the image acquired with flash light and the image acquired without flash light, calculation of an adaptive binarization threshold for each pixel of the image, the threshold for each pixel being the corresponding value in the difference map, to which is subtracted this corresponding value multiplied by a corresponding flashlight compensation factor value determined in a flashlight compensation factor map using an image of a non-reflective blank target acquired with flash light and to which is added this corresponding value multiplied by a corresponding background enhancement factor value determined in a background enhancement factor map using the image acquired without flash light, binarization of the difference map by attributing a first value to pixels where the adaptive binarization threshold value is higher than the corresponding value in the difference map and a second value to pixels where the adaptive binarization threshold value is lower than the corresponding value in the difference map, the binarized image being the slap/fingers foreground mask.

8 Claims, 3 Drawing Sheets

(51) Int. Cl.
*G06K 9/60* (2006.01)
*G06K 9/54* (2006.01)
*G06T 7/194* (2017.01)
*G06K 9/40* (2006.01)

(52) U.S. Cl.
CPC .......... *G06K 9/38* (2013.01); *G06K 9/40* (2013.01); *G06K 9/54* (2013.01); *G06K 9/60* (2013.01); *G06T 7/194* (2017.01); *G06T 2207/20224* (2013.01); *G06T 2207/30196* (2013.01)

(58) Field of Classification Search
CPC .......... G06K 9/00067; G06T 7/194; G06T 2207/20224; G06T 2207/30196
See application file for complete search history.

(56) References Cited

U.S. PATENT DOCUMENTS

2014/0366113 A1\* 12/2014 LeCun .......... G06K 9/6271
726/7
2019/0114469 A1\* 4/2019 Sartor .......... G06K 9/00255

\* cited by examiner

METHOD TO GENERATE A SLAP/FINGERS FOREGROUND MASK

FIELD OF THE INVENTION

The present invention relates to a method to generate a slap/fingers foreground mask to be used for subsequent image processing of fingerprints on an image acquired using a contactless fingerprint reader having at least a flash light.

The invention also pertains to a contactless acquired fingerprint image processor connected to at least a contactless fingerprint reader having at least a flash light and adapted to acquire images of slap/fingers in a contactless position in vicinity of the reader with or without flash light for the acquisition of fingerprints of a user implementing said method.

BACKGROUND OF THE INVENTION

With the traditional contact approaches, fingerprints are captured by a direct impression of the fingers onto a recording medium or device, e.g., ink, optical sensors, or electronic sensors. With the increasing demands for faster capture speed and better user experience, contactless fingerprint devices are introduced to the biometrics market. This invention relates to a novel method and an apparatus of the adaptive background subtraction for contactless fingerprint images.

More specifically, contactless fingerprint images are captured by the contactless fingerprint readers. Unlike the traditional contact fingerprint readers that only capture the slap/fingers touching with the reader, the contactless fingerprint readers take the photos of the whole slap/fingers presented above the device. Therefore, the captured photos contain both the slap/fingers as foreground and the scene behind the slap/fingers and the noise as background due to the nature of photographic representations from the contactless fingerprint readers. In order to identify the location of the slap/fingers, i.e., foreground, in the captured images, the background scene and noise need to be removed.

In contactless fingerprint images, the background subtraction becomes more challenging because:

1. Normally there is only one single image is captured for the same slap/fingers, so that the traditional statistical background modelling that requires a sequence of images would not work;

2. The presence of dynamic and strong background scene/noise could be salient in the image, e.g., strong background light, which may even suppress the foreground fingers;

3. The lighting/brightness from the captured images is not evenly distributed so that the foreground slap/fingers are with variant grayscale while their positions vary across different subjects.

Background subtraction is a fundamental step of the many image processing and computer vision applications or systems. In the past decades, various methods have been proposed in background subtraction in order to segment the foreground objects from the background scene. In one typical category of the applications, the foreground are identified by calculating the difference between frames with the object and frames without background. In other type of representative applications, the assumptions are the background can be statistically modeled and updated based on a sequence of the images.

Those generic techniques are described for example in the following documents:

U.S. Pat. No. 6,411,744B1 "Method and apparatus for performing a clean background subtraction".

Ahmed M. Elgammal, David Harwood, and Larry S. Davis. "Non-parametric Model for Background Subtraction". In Proceedings of the 6th European Conference on Computer Vision", 2000.

U.S. Pat. No. 5,748,775A "Method and apparatus for moving object extraction based on background subtraction"

M. Piccardi, "Background subtraction techniques: a review" 2004 IEEE International Conference on Systems, Man and Cybernetics Z. Zivkovic, "Improved adaptive Gaussian mixture model for background subtraction," Proceedings of the 17th International Conference on Pattern Recognition, 2004

Sobral, Andrews & Vacavant, Antoine. "A comprehensive review of background subtraction algorithms evaluated with synthetic and real videos". Computer Vision and Image Understanding, 2014

S. Liao, G. Zhao, V. Kellokumpu, M. Pietikäinen and S. Z. Li, "Modeling pixel process with scale invariant local patterns for background subtraction in complex scenes," 2010 IEEE Computer Society Conference on Computer Vision and Pattern Recognition, San Francisco, Calif., 2010

W. Kim and C. Kim, "Background Subtraction for Dynamic Texture Scenes Using Fuzzy Color Histograms," in IEEE Signal Processing Letters, vol. 19, no. 3, pp. 127-130, March 2012.

Dar-Shyang Lee, "Effective Gaussian mixture learning for video background subtraction," in IEEE Transactions on Pattern Analysis and Machine Intelligence, vol. 27, no. 5, pp. 827-832, May 2005.

J. Yao and J. Odobez, "Multi-Layer Background Subtraction Based on Color and Texture," 2007 IEEE Conference on Computer Vision and Pattern Recognition, Minneapolis, Minn., 2007

K. Shafique, O. Javed and M. Shah, "A Hierarchical Approach to Robust Background Subtraction using Color and Gradient Information," Motion and Video Computing, IEEE Workshop on (MOTION), Orlando, Fla., 2002.

However, in the contactless fingerprint identification system, both approaches become challenging to capture image sequences for the statistical modelling and the background scene can also vary from time to time. Therefore, there is a need for a new approach on contactless fingerprint identification system.

Further alternative and advantageous solutions would, accordingly, be desirable in the art.

SUMMARY OF THE INVENTION

The present invention aims to propose a new approach for background subtraction in the specific field of contactless fingerprint identification system.

The present invention is defined, in its broadest sense, as a method to generate a slap/fingers foreground mask to be used for subsequent image processing of fingerprints on an image acquired using a contactless fingerprint reader having at least a flash light, said method comprising the following steps:

acquisition of two images of the slap/fingers in a contactless position in vicinity of the reader, one image taken with flash light on and one image taken without flash light, calculation of a difference map between the image acquired with flash light and the image acquired without flash light, calculation of an adaptive binarization threshold for each pixel of the image, the threshold for each pixel being the corresponding value in the difference map, to which is subtracted this corresponding value multiplied by a corresponding flashlight compensation factor value determined in a flashlight compensation factor map using an image of a non-reflective blank target acquired with flash light and to which is added this corresponding value multiplied by a corresponding background enhancement factor value determined in a background enhancement factor map using the image acquired without flash light, binarization of the difference map by attributing a first value to pixels where the adaptive binarization threshold value is higher than the corresponding value in the difference map and a second value to pixels where the adaptive binarization threshold value is lower than the corresponding value in the difference map, the binarized image being the slap/fingers foreground mask.

With the help of this invention, the effective foreground, i.e., the slap/fingers region, can be identified and extracted by adaptively calculating the difference between different regions. The extracted clean foreground is then represented by a foreground masks that can be used for advanced fingerprint processing tasks in the contactless fingerprint identification systems.

This invention is a unique and efficient solution that combines both hardware and software capabilities of the contactless fingerprint identification systems. It only needs two images and a minimum hardware setup to solve the problem. In terms of the hardware, it receives two images for the same subject, one is with the flash light on, the other one is with the flash light off, then the apparatus is able to transmit, process, and save the captured images. In terms of software, the proposed algorithms are able to adaptively calculate the difference between the foreground and background area based on two captured images, then generate the accurate foreground masks for the slap/fingers.

In terms of the functionalities, the invention handles various scenarios, with which the contactless fingerprint identification systems are able to work more robustly in different locations. In terms of the performance, the invention not only accurately identifies the foreground slap/fingers area but also boost the speed of the traditional background modelling techniques, which greatly improves the performance of the contactless fingerprint identification system. In terms of the cost, the invention relieves the burden of the product design that requires a more sophisticated view window and cover to remove the cluttered background scene and noise. In terms of business needs, the invention is one of core features for the customers.

Advantageously, the method further comprises a step of noise removal in the binarized image.

According to a specific feature of the invention, the flashlight compensation factor is defined for each pixel by a standard illumination value of the pixel divided by a reference illumination value of the pixel as obtained in the image of the non-reflective blank target, this image being a reference image.

According to another specific feature of the invention, the background enhancement factor is defined for each pixel by a brightness of the background in the image with the flash light off divided by an average of brightness of the slap/fingers with the flash light on for different subjects.

The present invention also relates to a contactless acquired fingerprint image processor connected to at least a contactless fingerprint reader having at least a flash light and adapted to acquire images of slap/fingers in a contactless position in vicinity of the reader with or without flash light for the acquisition of fingerprints of a user, said processor being adapted to generate a slap/fingers foreground mask to be used for subsequent image processing of fingerprints, said processor, when receiving two images of the slap/fingers in a contactless position in vicinity of the reader, one image taken with flash light on and one image taken without flash light, being adapted to calculate a difference map between the image acquired with flash light and the image acquired without flash light, to calculate an adaptive binarization threshold for each pixel of the image, the threshold for each pixel being the corresponding value in the difference map, to which is subtracted this corresponding value multiplied by a corresponding flashlight compensation factor value determined in a flashlight compensation factor map using an image of a non-reflective blank target acquired with flash light and to which is added this corresponding value multiplied by a corresponding background enhancement factor value determined in a background enhancement factor map using the image acquired without flash light, said processor being further adapted to binarize the difference map by attributing a first value to pixels where the adaptive binarization threshold value is higher than the corresponding value in the difference map and a second value to pixels where the adaptive binarization threshold value is lower than the corresponding value in the difference map, the resulting binarized image being a slap/fingers foreground mask to be used for subsequent image processing of fingerprints on the image acquired using the contactless fingerprint reader.

Advantageously, the processor is further adapted to remove noise from the binarized image.

It is also advantageously adapted to define the flashlight compensation factor for each pixel as a standard illumination value of the pixel divided by a reference illumination value of the pixel as obtained in the image of the non-reflective blank target, this image being a reference image.

Said processor is also further advantageously adapted to define the background enhancement factor for each pixel as a brightness of the background in the image with the flash light off divided by an average of brightness of the slap/fingers with the flash light on for different subjects.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
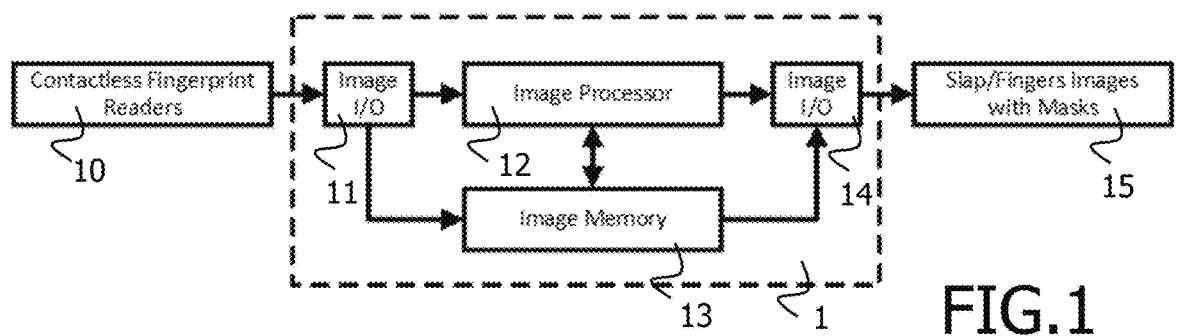
FIG. 1 is the schematic diagram of the environment where the invention is implemented.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 is the schematic diagram of the invented apparatus 1. It includes 3 major components two image I/O functions 11 and 14, an image processor 12 and an image memory 13. The invented apparatus 1 is connected to at least one contactless fingerprints reader 10 to receive captures of fingerprints.

Thus, according to the invention, the image I/O function 11 receives raw contactless slap/fingers images including both flashed and non-flashed slap/fingers images from the contactless fingerprint reader 10. Those images are shown on FIG. 3.

The image I/O function 11 then transmits the images to the image processor 12 and to the image memory 13. It can also output the processed images to other components of the contactless fingerprint identification systems when applicable.

The image processor 12 implements the invention while processing the received images. At the end of the method of the invention, accurate foreground slap/fingers masks are generated.

The image memory storage 13, including ROM and RAM memory, is able to save the captured or processed images.

Figure 2:
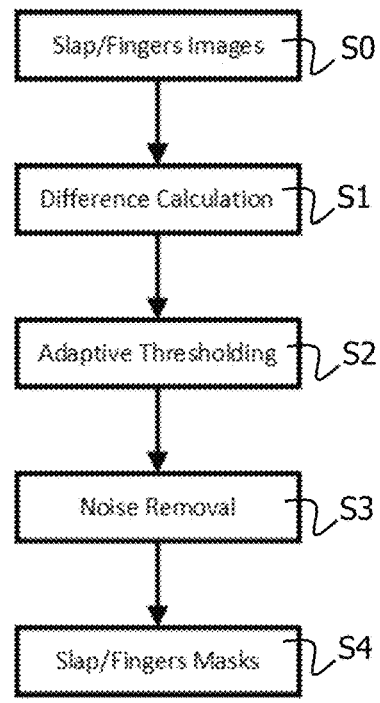
FIG. 2 shows a flowchart of the background subtraction method for contactless fingerprint images of the invention.

FIG. 2 shows a flowchart of the background subtraction method for contactless fingerprint images of the invention. First, two slap/fingers images are received from the contactless fingerprint scanner 10 for the same subject in a step S0, one is captured with the flash light on, the other is captured with the flash light off.

Second, the difference between the two images is calculated and a difference map is generated in a step S1. Third, due to the uneven flash light and background noise, the difference map is adaptively binarized using an adaptive thresholding in a step S2. Initial foreground masks are thus generated. Fourth, in a step S3, morphological operations are applied to the initial foreground map in order to remove the random noise and structure noise. Finally, the final accurate slap/fingers masks are generated in a step S4.

Figure 3:
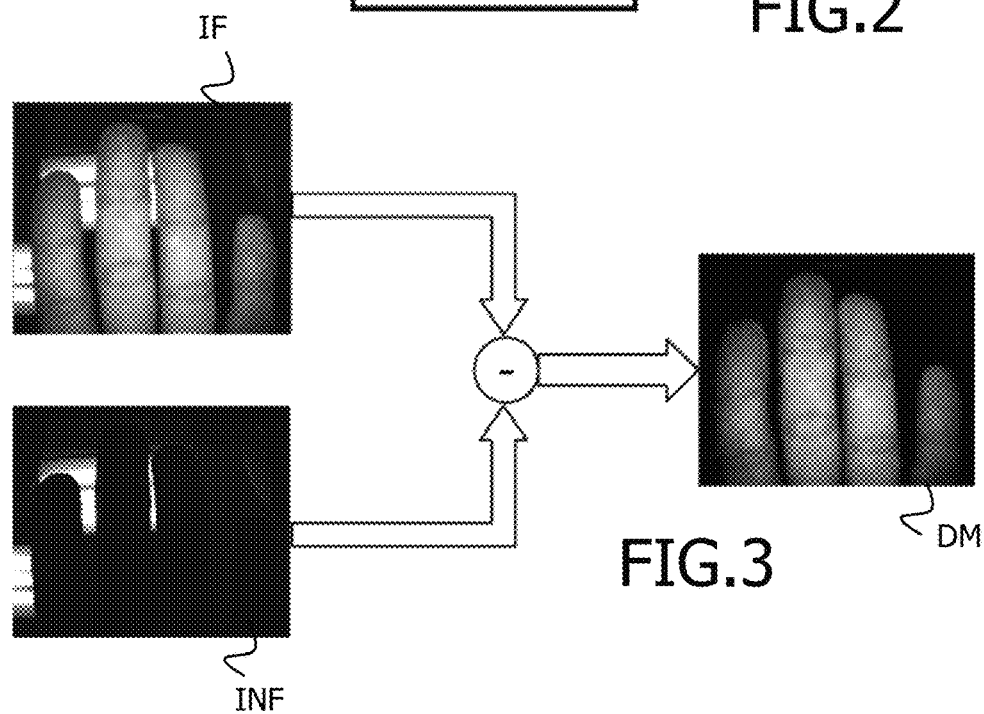
FIG. 3 shows flash on/off image difference map calculation.

FIG. 3 is an example illustrating how to generate the initial foreground map of the images with a flash on/off image difference map calculation. Two images, one is with flash on IF and the other is with flash off INF, received from the contactless fingerprint scanner 11 are captured continuously with an interval less than 10 ms. This is thus assumed that there is no movement of the slap/fingers between two images IF and INF. The difference between the two images IF and INF would be the portion that can be lighted up by the flash light and the noise.

Because the background scene is normally beyond the scope of the flash light, the subjects lighted up include slap/fingers and some parts of the scanner itself. Based on the special pattern of the lighted slap/fingers, an initial foreground map, i.e., slap/fingers, can be generated by calculating a difference between the two images IF and INF. As shown on FIG. 3, a difference map DM is obtained.

A foreground map is generated according to the invention by calculating the grayscale difference of every pixel between flashed image and the non-flashed image according to the following equation: $ID(x,y)=|IF(x,y)-INF(x,y)|$ where $IF(x,y)$ is the pixel value of the flashed image at position $(x,y)$, and $INF(x,y)$ is the pixel value of the non-flashed image at the same position, and $ID(x,y)$ is the absolute difference between the two images IF and INF.

Figure 4:
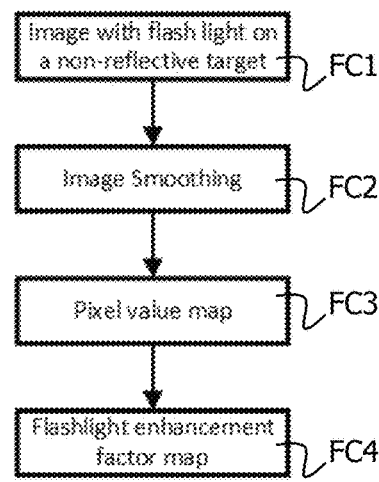
FIG. 4 shows a flowchart of the flashlight enhancement factor map calculation.

FIG. 4 is a flowchart of the flashlight enhancement factor map calculation illustrating how to compensate the uneven distributed flash light in the flashed slap/fingers images IF. Due to the hardware limit, the flash light in the slap/fingers image is not evenly distributed, the image center receives the strongest flash light, and the strength of the flash light decreases along the direction from the image center to the image border. However, the physical shape and locations of the slap/fingers require that all the area in the image are evenly illuminated, especially along the border of the image IF where the fingers are more likely to be located at.

The invention proposes to compensate the uneven flash light by calculation of a compensation factor. A special non-reflective target is used to cover the field of view of the contactless acquisition device 10.

An image of this non-reflective target is then taken in a step C1 with the flash light on as a reference image IR of the flash light distribution. The obtained image is then smoothed in a step C2 to obtain a pixel value map in a step C3. Then a flashlight compensation or enhancement factor map FCM being indeed also a pixel value map is defined in a step C4 as: $\alpha(x,y)=IS(x,y)/IR(x,y)$ where $\alpha(x,y)$ is the flashlight compensation factor for the image pixel at position $(x,y)$, $IS(x,y)$ is the standard illumination value of the pixel $(x,y)$, which equals to the average brightness level in the image center area with no vignetting effect, and $IR(x,y)$ is the reference pixel value at the same position. The flashlight compensation factor map FCM is then saved in the image memory 13, and retrieved when a new difference map ID needs to be rectified.

Figure 5:
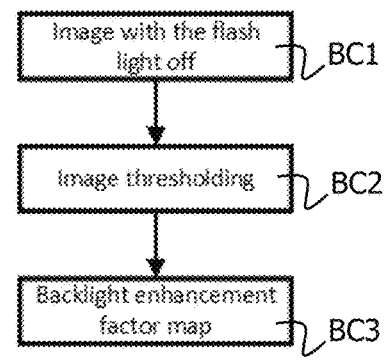
FIG. 5 shows a flowchart of the backlight enhancement factor map calculation.

FIG. 5 is a flowchart the backlight enhancement factor map calculation illustrating how to obtain the background enhancement factor map BCM. As aforementioned, the presence of dynamic and strong background scene/noise, e.g., strong background light, could be salient in images and corrupt the foreground slap/fingers if the traditional binarization methods are used. According to the invention, the binarization is performed to adaptively increase/decrease a threshold used for binarization to adapt the brightness in the captured images.

To determine the background enhancement factor map BCM, multiple sample images are taken before manufacturing with the flash on across different subjects, then the brightness of slap/fingers is evaluated based on the collected sample images. The average strength of the brightness of the slap/fingers from multiple subjects is denoted as BF, which is generated and saved in software development kit (SDK) for all the devices. During the normal operation of the device, i.e., the device is installed on the field to capture fingerprints, for each capture, the image with the flash light off is taken at the first step BC1. The image is thresholded in a step BC2. The average strength of the brightness is denoted as BNF(x,y). The background enhancement factor BCM is formulated in a step BC3 as: β(x,y)=BNF(x,y)/BF. A background enhancement factor map BCM is thus obtained for the installed device that will capture fingerprints.

Figure 6:
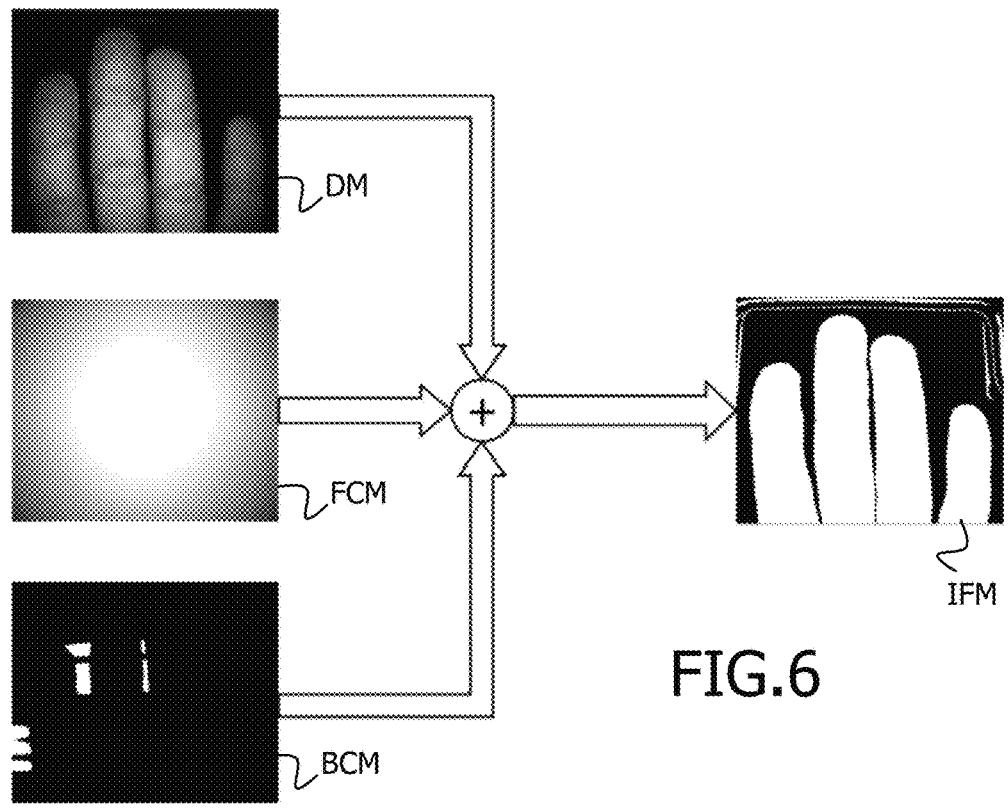
FIG. 6 illustrates the adaptive thresholding for the difference map of the invention.

FIG. 6 shows adaptive thresholding for the difference map and how the earlier obtained difference map DM is converted into an initial foreground masks IFM. Three inputs are used for this conversion. The first one is the initial difference map DM that shows the essential difference map of the flash on and flash off images. The second one is the flash light compensation map FCM that compensates the flashlight and eliminates the inaccuracy introduced by the degraded flash light strength along the image border. The last one is the background enhancement factor map BCM that rectified the existing strong background in the image.

Then, the adaptive binarization threshold T is formulized, according to the invention, as T(x,y)=ID(x,y)*(1−α(x,y)+β(x,y)).

The initial difference map ID is then binarized into an initial foreground mask IFM as:

M(x,y)=255 if T(x,y)≥ID(x,y) and 0 if T(x,y)<ID(x,y)

where M(x,y) is the pixel value of the initial foreground mask IFM at position (x,y), which contains both the slap/fingers and the noise as shown in FIG. 6. Once the initial foreground map is generated, there is a need to identify and remove the noise existing in the image, including random noise and the structure noise. There is thus a need to remove noise to generate a final foreground mask FFM. In the invention, morphological operations to remove the structure and random noise are applied.

In the experiments, inventors found that structure noise exists in the image where at least a part of the device housing is captured. Also the background noise may cause some additional random noise. This can be seen on the initial foreground mask IFM as shown on the right picture on FIG. 6.

So that, the morphological operations are used to remove all types of noise. First, opening operations are applied to the image, which removes small objects and the random noise from the image, e.g., the device body in the image, then the closing operations are applied to the image, which removes small holes in the foreground, and smooth the edge of the slap/fingers.

Figure 7:
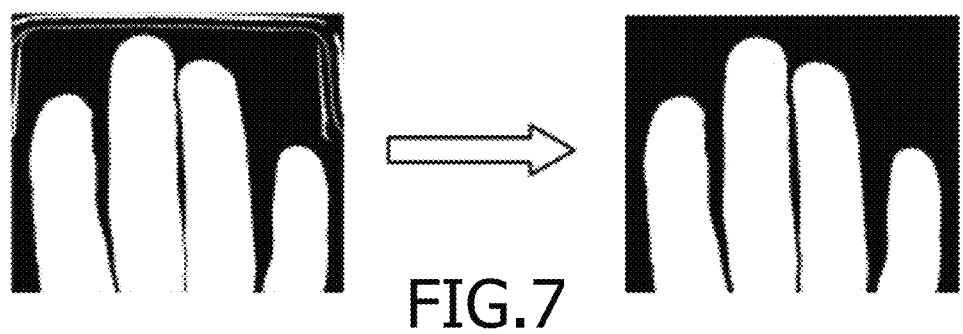
FIG. 7 shows noise removal and final slap/fingers mask generation.

FIG. 7 shows noise removal and final slap/fingers mask generation as a comparison before and after noise removal, the result is the final foreground mask FFM for the slap/fingers. Once the final slap/finger foreground mask FFM is obtained, it is saved in the image memory 13. The thus obtained final foreground mask FFM is made as inputs to other modules in a contactless fingerprint identification system for advanced contactless fingerprint processing tasks.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted.

The invention claimed is:

1. A method to generate a slap/fingers foreground mask to be used for subsequent image processing of fingerprints on an image acquired using a contactless fingerprint reader having at least a flash light, said method comprising the following steps:
   acquisition of two images of the slap/fingers in a contactless position in vicinity of the reader, one image taken with flash light on and one image taken without flash light,
   calculation of a difference map between the image acquired with flash light and the image acquired without flash light,
   calculation of an adaptive binarization threshold for each pixel of the image, the threshold for each pixel being the corresponding value in the difference map, to which is subtracted this corresponding value multiplied by a corresponding flashlight compensation factor value determined in a flashlight compensation factor map using an image of a non-reflective blank target acquired with flash light and to which is added this corresponding value multiplied by a corresponding background enhancement factor value determined in a background enhancement factor map using the image acquired without flash light,
   binarization of the difference map by attributing a first value to pixels where the adaptive binarization threshold value is higher than the corresponding value in the difference map and a second value to pixels where the adaptive binarization threshold value is lower than the corresponding value in the difference map, the binarized image being the slap/fingers foreground mask.

2. The method according to claim 1, further comprising a step of noise removal in the binarized image.

3. The method according to claim 1, wherein the flashlight compensation factor is defined for each pixel by a standard illumination value of the pixel, which equals to the average brightness level in the image center area with no vignetting effect, divided by a reference illumination value of the pixel as obtained in the image of the non-reflective blank target, this image being a reference image.

4. The method according to claim 1, wherein the background enhancement factor is defined for each pixel by a brightness of the background in the image with the flash light off divided by an average of brightness of the slap/fingers with the flash light on for different subjects.

5. A contactless acquired fingerprint image processor connected to at least a contactless fingerprint reader having at least a flash light and adapted to acquire images of slap/fingers in a contactless position in vicinity of the reader with or without flash light for the acquisition of fingerprints of a user, said processor being adapted to generate a slap/fingers foreground mask to be used for subsequent image processing of fingerprints, said processor, when receiving two images of the slap/fingers in a contactless position in vicinity of the reader, one image taken with flash light on and one image taken without flash light, being adapted to calculate a difference map between the image acquired with flash light and the image acquired without flash light, to calculate an adaptive binarization threshold for each pixel of the image, the threshold for each pixel being the corresponding value in the difference map, to which is subtracted this corresponding value multiplied by a corresponding flashlight compensation factor value determined in a flashlight compensation factor map using an image of a non-reflective blank target acquired with flash light and to which is added this corresponding value multiplied by a corresponding background enhancement factor value determined in a background enhancement factor map using the image acquired without flash light, said processor being further adapted to binarize the difference map by attributing a first value to pixels where the adaptive binarization threshold value is higher than the corresponding value in the difference map and a second value to pixels where the adaptive binarization threshold value is lower than the corresponding value in the difference map, the resulting binarized image being a slap/fingers foreground mask to be used for subsequent image processing of fingerprints on the image acquired using the contactless fingerprint reader.

6. The contactless acquired fingerprint image processor according to claim 5, wherein the processor is further adapted to remove noise from the binarized image.

7. The contactless acquired fingerprint image processor according to claim 5, said processor being adapted to define the flashlight compensation factor for each pixel as a standard illumination value of the pixel divided by a reference illumination value of the pixel as obtained in the image of the non-reflective blank target, this image being a reference image.

8. The contactless acquired fingerprint image processor according to one of claim 5, said processor being adapted to define the background enhancement factor for each pixel as a brightness of the background in the image with the flash light off divided by an average of brightness of the slap/fingers with the flash light on for different subjects.

\* \* \* \* \*